(12) United States Patent
Sakamoto et al.

(10) Patent No.: US 7,850,071 B2
(45) Date of Patent: Dec. 14, 2010

(54) PORTABLE TOOL AND WORK MANAGEMENT DATA COLLECTION SYSTEM

(75) Inventors: Gorou Sakamoto, Tokyo (JP); Tomohiko Serita, Tokyo (JP)

(73) Assignee: Max Co., Ltd., Tokyo (JP)

(*) Notice: Subject to any disclaimer, the term of this patent is extended or adjusted under 35 U.S.C. 154(b) by 772 days.

(21) Appl. No.: 11/884,274

(22) PCT Filed: Feb. 15, 2006

(86) PCT No.: PCT/JP2006/302655
§ 371 (c)(1), (2), (4) Date: Aug. 14, 2007

(87) PCT Pub. No.: WO2006/088060
PCT Pub. Date: Aug. 24, 2006

(65) Prior Publication Data
US 2010/0140345 A1     Jun. 10, 2010

(30) Foreign Application Priority Data
Feb. 15, 2005   (JP) ............................ 2005-038186

(51) Int. Cl.
G06F 7/00       (2006.01)
G07C 3/00       (2006.01)
(52) U.S. Cl. .................. 235/376; 235/377; 235/380; 235/385; 377/15; 377/16; 377/20; 340/679; 340/680
(58) Field of Classification Search ............ 235/375, 235/385, 376, 377, 380; 377/15, 16, 20; 340/679, 680
See application file for complete search history.

(56) References Cited

U.S. PATENT DOCUMENTS

| 4,980,542 A * | 12/1990 | Jackson et al. ........... 235/375 |
| 2002/0021206 A1 * | 2/2002 | Wootton et al. ........... 340/5.61 |

FOREIGN PATENT DOCUMENTS

| DE | 101 56 218 A1 | 6/2003 |
| JP | 9-174460 | 7/1997 |
| JP | 11-193631 | 7/1999 |
| JP | 2001-353672 | 12/2001 |
| JP | 2003-337882 | 11/2003 |
| JP | 2004-102482 | 4/2004 |
| JP | 2004-524987 | 8/2004 |
| JP | 2004-287821 | 10/2004 |
| WO | WO 2004/003695 A2 | 1/2004 |

\* cited by examiner

*Primary Examiner*—Thien M. Le
*Assistant Examiner*—Christle I Marshall
(74) *Attorney, Agent, or Firm*—Drinker Biddle & Reath LLP

(57) ABSTRACT

A work management data collection system 1 is provided with a data collection mechanism in a tool 2, and by counting a number of times a work operation has been executed or the like, obtains a work data identifying the work task that has been executed and detects a time data required for the work task. The system is provided with an RFID tag 3*a* on an ID card 3 held by a worker, and by writing data into the ID card 3 of the worker who carried out the work task, using an RFID reader/writer 4 provided on the tool 2, the system obtains data necessary for the work management from the ID card 3 of the worker.

8 Claims, 3 Drawing Sheets

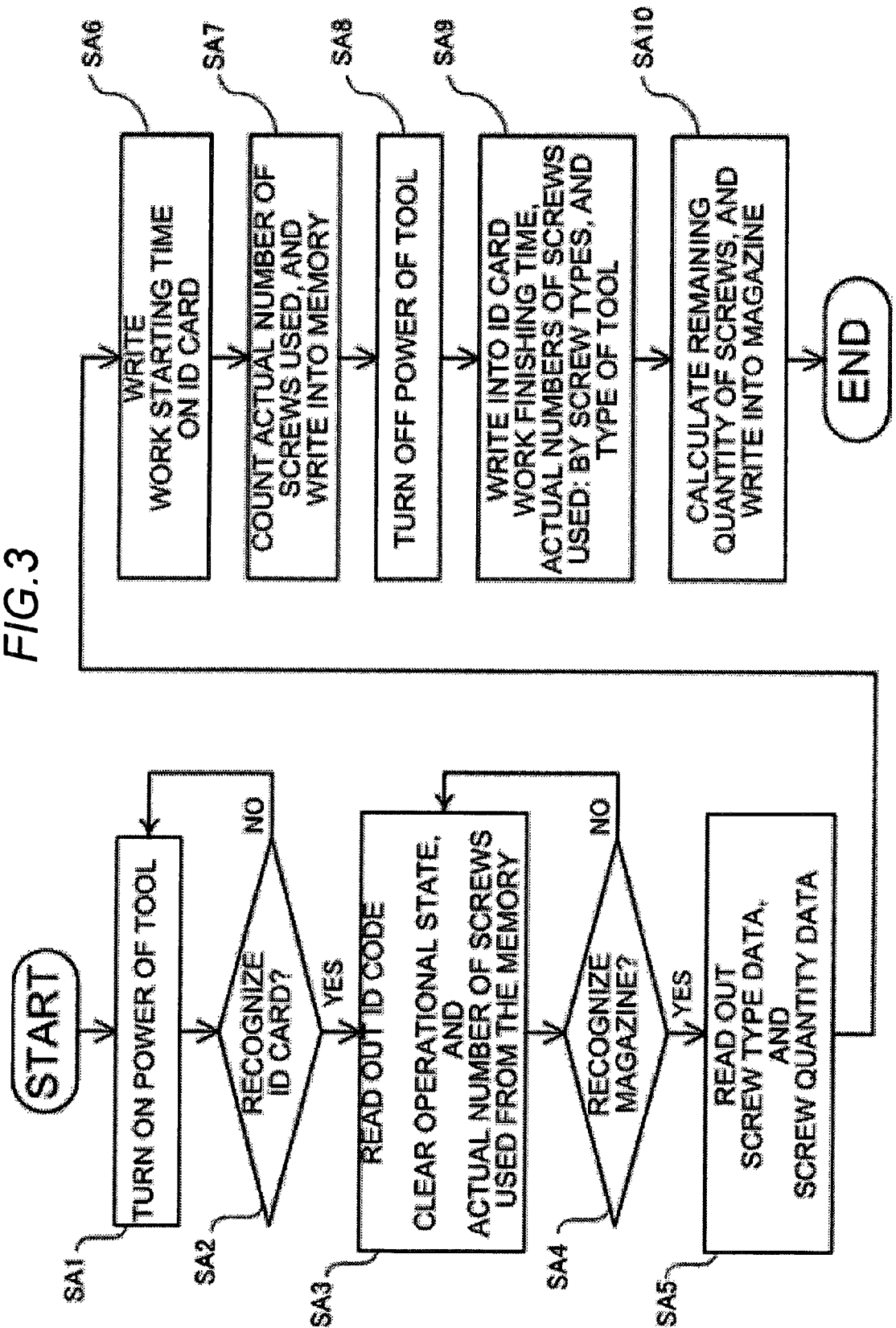

PORTABLE TOOL AND WORK MANAGEMENT DATA COLLECTION SYSTEM

TECHNICAL FIELD

The present invention relates to a tool (portable tool) used at a construction site or the like, and a work management data collection system employing the tool. More particularly, the invention relates to the acquisition of data necessary for work management relevant to the tool used by a worker, thereby allowing such data to be collected automatically.

BACKGROUND ART

In the construction industry and the like, there have been efforts for introducing work management software which employs a method such as CPM (Critical Pass Method) for optimizing the allocation of human and material resources etc. (for example, JP-A-11-193631).

The work management software requires inputs of data indicating an allocation of human and material resources, and conventionally, those efforts to collect data and to input the collected data have been carried out manually.

The use of the work management software allows the resource allocation to be done automatically. However, the collection of data and input of the collected data are conventionally done manually, thus there has been a problem that it requires a large amount of time for the allocation of resources using the work management software. As a result, an applicable range of the work management software has become very small, so that there has been a problem that it was not fully utilized.

DISCLOSURE OF THE INVENTION

One or more embodiments of the invention provide a tool and a work management data collection system capable of automatically acquiring data necessary for the work management.

According to one or more embodiments of the invention, a tool (portable tool) which is operated by a worker in order to carry out a work task is provided with: a work data acquisition unit obtaining a work data which specifies the work task to be carried out; a storage unit storing the work data acquired by the work data acquisition unit; a clocking unit for clocking a working time; a read and write unit reading and writing data from and to an external data storage unit which is independent from the body of the tool; and a controller which reads out a worker identification data to identify the worker using the read and write unit from an ID card of the worker, which carries the external data storage unit, and at the same time, writes the work data stored in the storage unit and the working time data clocked by the clocking unit into the external data storage unit of the ID card of the worker who has been identified by the worker identification data, using the read and write unit.

Furthermore, according to one or more embodiments of the invention, the tool contains a consumable supply used during works, and it may comprise a consumable supply container which can be freely attached to and removed from the body the tool, and a consumable supply data storage unit, as the external data storage unit, storing a consumable supply identification data identifying a type of the consumable supply and a consumable supply quantity data. The controller reads out the consumable supply identification data and the consumable supply quantity data using the read and write unit to identify the type of the consumable supply, and to take note of a quantity of the consumable supply prior to the start of a work task, and calculates a remaining quantity of the consumable supply left within the consumable supply container, from the quantity of the consumable supply consumed as a result of carrying out the work task, and writes the remaining quantity of the consumable supply into the consumable supply data storage unit of the consumable supply container, using the read and write unit.

According to one or more of embodiments of the invention, the external data storage unit may be one mounted on a wireless tag wirelessly transmitting and receiving data, and the read and write unit may be one which reads and writes data through wireless communications.

According to one or more embodiment of the invention, the portable tool may be a screwing machine.

According to one or more embodiment of the invention, the portable tool may be a nailing machine.

According to one or more embodiments of the invention, in a work management data collection system collecting data necessary for work management, a tool operated by a worker in order to carry out a work task is provided with; a work data acquisition unit for obtaining a work data which identifies a work task that has been carried out; a storage unit storing the work data obtained by the work data acquiring unit; a clocking unit clocking a working time; a read and write unit reading and writing from and to an external data storage unit separate from the body of the tool; and a controller writing the work data stored in the storage unit and the working time data clocked by the clocking unit into the external data storage unit on an ID card of a worker who has been identified by a worker identification data; wherein any data necessary for the work management is captured from the ID card of the worker.

According to one or more embodiments of the invention, the tool may comprise a consumable supply container which contains a consumable supply used during a work task, and can be freely attached to, and removed from the body of the tool, and a consumable supply data storage unit, as the external data storage unit, storing a consumable supply identification data identifying a type of the consumable supply and a consumable supply quantity data. The controller reads out the consumable supply identification data and the consumable supply quantity data from the consumable supply data storage unit of the consumable supply container using the read and write unit to identify a type of the consumable supply and to recognize the quantity of the consumable supply prior to the start of the work task, and calculates a remaining quantity of the consumable supply left within the consumable supply container from a quantity of the consumable supply used as a result of carrying out the work task, and writes the remaining quantity data of the consumable supply into the consumable data storage unit of the consumable supply container using the read and write unit.

According to one or more embodiments of the invention, the external data storage unit may be one mounted on a wireless tag wirelessly transmitting and receiving data, and the read and write unit may be one which reads and writes data through wireless communications.

Using the tool according to one or more embodiments of the invention, by having workers carry out their work tasks, it is possible to collect data necessary for work management such as types of work tasks carried out and working times etc.

Using the work management data collection system according to one or more embodiments of the invention, by obtaining data necessary for work management using the tool, and writing them into ID cards of workers, it is possible to obtain the data necessary for the work management from the ID cards of the respective workers.

In this way, the collection of data and input of the collected data and the like may be performed automatically, so that the time required for the resource allocation may be reduced drastically through the use of the work management software.

Other aspects and advantages of the invention will be apparent from the following description and the appended claims.

BRIEF DESCRIPTION OF THE DRAWINGS

FIG. 3 is a flow chart showing a flow of steps of the work management data collection system according to the embodiment of the invention.

DESCRIPTION OF REFERENCE NUMERALS AND SIGNS

1: Work management data collection system, 2: Tool, 3: ID card, 3a: RFID tag, 4: RFID reader/writer, 5: Magazine, 5a: RFID tag, 6: Antenna, 7: IC chip, 7a: Memory, 8: Antenna, 9: IC chip, 9a: Memory, 10: Antenna, 11: IC chip, 12: Drive mechanism, 12a: Motor, 13: Controller, 14: CPU, 15: Memory, 16: Timer

BEST MODE FOR CARRYING OUT THE INVENTION

Embodiments of the tool and the work management data collection system according to the invention will now be explained with reference to the figures.

<Outline of the Tool and the Work Management Data Collection System>

Figure 1:
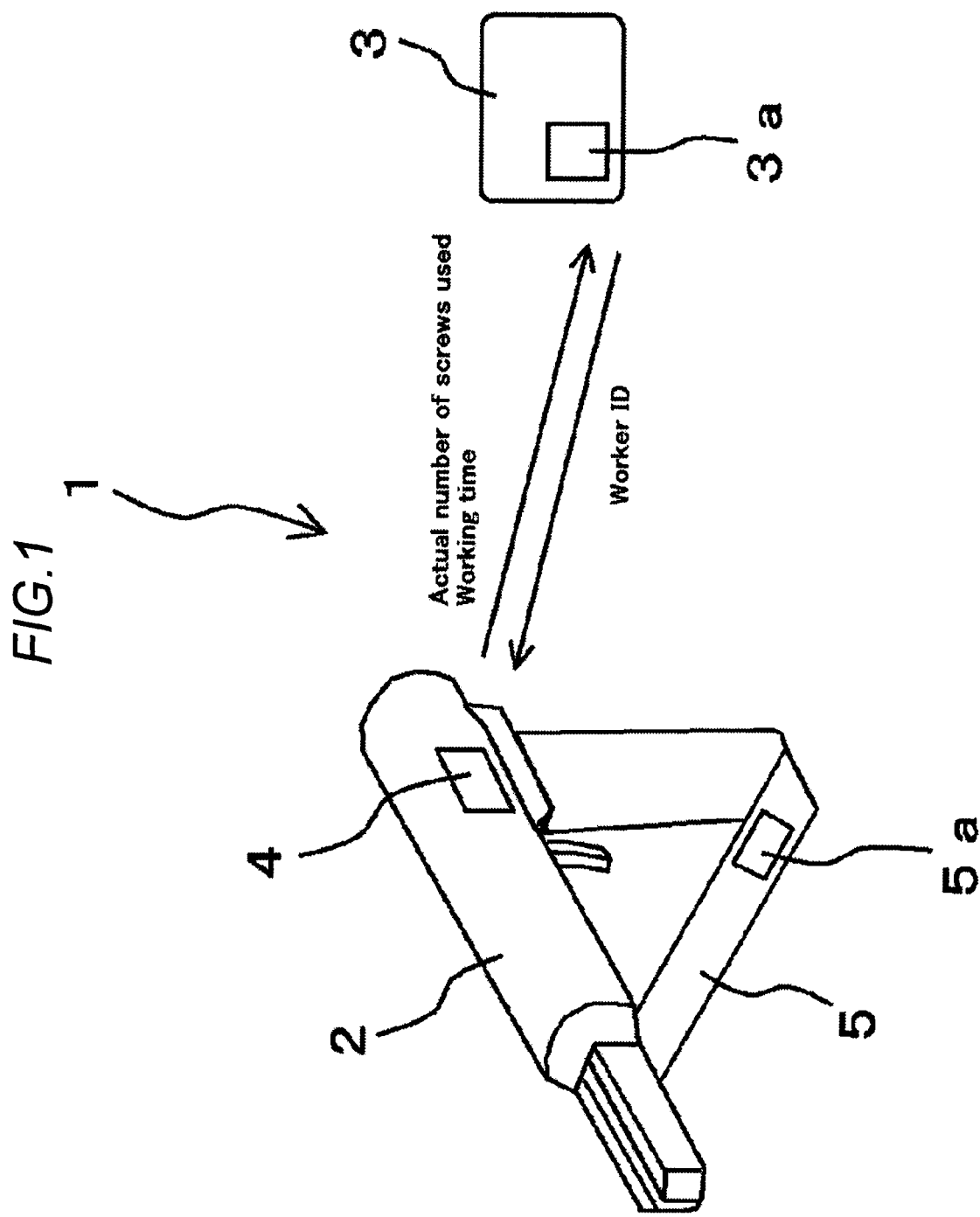
FIG. 1 is a block diagram showing an exemplary work management data collection system according to one embodiment of the invention.

FIG. 1 is a block diagram showing an outline of the work management data collection system according to one embodiment. The work management data collection system 1 of the embodiment comprises a data collecting function in the tool (portable tool) 2, and by counting a number of times the work operation has been executed, detects a time data required for the work task, as well as obtaining a work data identifying the work task carried out.

An ID card 3 held by a worker comprises an RFID tag (wireless tag) 3a, and by writing the data into the ID card 3 of the worker who carried out the work task, using an RFID reader/writer provided on the tool 2, the data necessary for work management may be obtained from the ID card 3 of the worker.

<Exemplary Configuration of the Tool and the Work Management Data Collection System>

Figure 2:
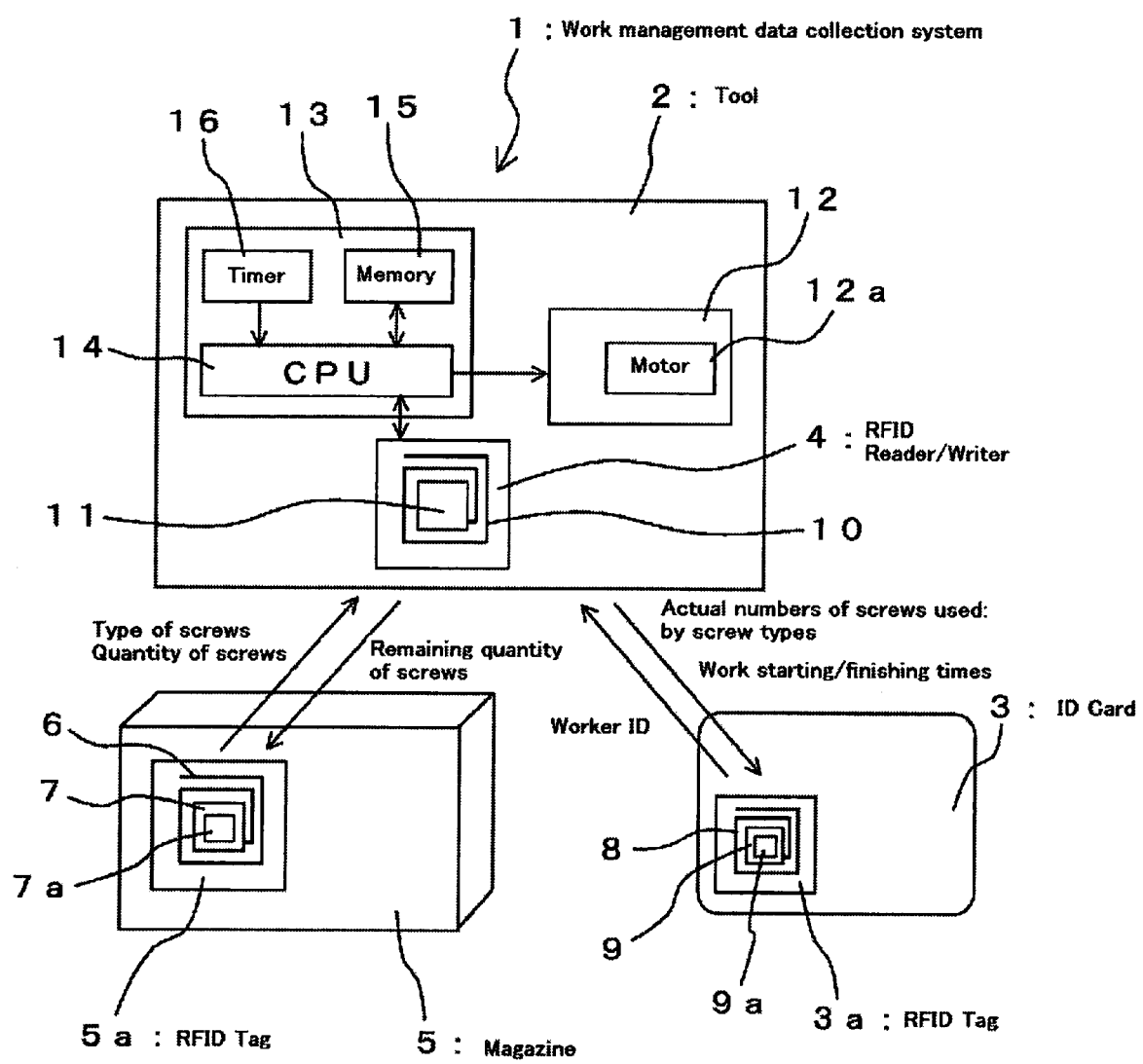
FIG. 2 is a functional block diagram showing an exemplary configuration of the tool and the work management data collection system according to one embodiment of the invention.

FIG. 2 is a functional block diagram showing an exemplary configuration of the tool and the work management data collection system according to one embodiment. The tool 2 is, for example, a screwing machine performing a screwing work, provided with a magazine 5 dispensably holding screws, not shown in the figure. The tool may also be a nailing machine, for example.

The magazine 5 is one example of the consumable supply container which is configured so that it can be attached to and removed from the tool 2, and it comprises an RFID tag (wireless tag) 5a. The RFID tag 5a comprises an antenna 6 and an IC chip 7, and it wirelessly transmits data stored within a memory 7a of the IC chip 7 from the antenna 6, and stores data received by the antenna 6 into the memory 7a of the IC chip 7.

The memory 7a of the RFID tag 5a is one example of a consumable supply data storage unit (consumable supply data storage device), and in this example, it stores a type of screws held in the magazine 5 as the consumable supply identification data, as well as a number of the screws held as the quantity data.

The RFID tag 3a provided on the ID card 3 has a similar configuration, and the RFID tag 3a comprises an antenna 8 and an IC chip 9, and transmits data stored within a memory 9a of the IC chip 9 from the antenna 8, and stores data received by the antenna 8 into the memory 9a of the IC chip 9.

The memory 9a of the RFID tag 3a is one example of a external data storage unit (external data storage device), and in this example, it stores an ID code or the like given to each worker as the worker identification data. It also stores work starting/finishing times as the working time data. It further stores, as the work data, a type of the tool 2 and a number of times the work operation has been executed, in this example, an actual number of times screws have been dispensed etc.

The RFID reader/writer 4 provided on the tool 2 is one example of a read and write unit (read and write device), and it reads and writes data from and to the RFID tag 5a of the magazine 5 and the RFID tag 3a of the ID card 3 held by the worker.

The RFID reader/writer 4 comprises an antenna 10 and an IC chip 11 etc., and when, for example, a magazine 5 is attached to the tool 2, the RFID tag 5a and the RFID reader/writer come into a positional relationship which allows communication therebetween, and writing and reading of data to and from the RFID tag 5a are performed via wireless communications.

When the ID card 3 is brought into a proximity of the tool 2 until the RFID tag 3a of the ID card 3 and the RFID reader/writer 4 come into a positional relationship which allows communication therebetween, writing and reading of data to and from the RFID tag 3a are performed via wireless communications.

The tool 2 comprises a drive mechanism 12 performing the screwing operation and a controller 13 controlling the drive mechanism 12 etc. The drive mechanism 12 comprises a motor 12a and the like as a driving source of the screwing operation, and it performs an operation to dispense screws one by one from the magazine 5 and to drive in the screws which have been dispensed.

The controller 13 comprises a CPU 14, a memory (the storage device) 15 such as a RAM and the like, and a timer (clocking device) 16. The CPU 14 is one example of a work data acquisition unit (work data acquisition device) and a controller (control device), and when a trigger lever, not shown, is operated, it starts the motor 12a to perform the screwing operation.

CPU 14 then counts the actual number of times screws have been dispensed, and stores it, as an actual number of screws used, into the memory 15, which is one example of the storage unit. The CPU 14 further calculates a remaining number of screws left within the magazine 5, which decreases as the screwing operation progresses.

The counting of the actual number of screws used is performed upon detecting a manipulation of an actuating part, not shown, for performing the screwing operation, or upon detecting a specified operation invoked by driving the motor 12a for performing the screwing operation.

Furthermore, the CPU 14 detects a work starting time and a work finishing time by the timer 16 which is one example of the clocking unit.

<Exemplary Operation of the Work Management Data Collection System>

FIG. 3 is a flow chart showing a flow of steps of the work management data collection system according to the embodiment. The operations of the work management data collection system which uses the tool 2 according to the embodiment will now be explained.

Step SA1: A worker turns on the power of the tool 2.

Step SA2: The CPU 14 of the tool 2 determines whether or not the RFID reader/writer 4 detected an RFID tag 3a of an ID card 3 as a result of the presence of the ID card 3 of a worker within a communication range covered by the RFID reader/writer 4.

It is preferable, that the RFID reader/writer 4 and the ID card 3 will come into their communication range when, for example, the worker wearing the ID card 3 holds the tool 2 in his hands, however, a configuration which requires the ID card 3 to be held close to the RFID reader/writer 4 at the start or the end of the works is also possible.

Step SA3: The CPU 14 of the tool 2, when the RFID reader/writer 4 recognizes the ID card 3, starts communication using the RFID reader/writer 4, and reads out the worker identification data (ID code) from the RFID tag 3a of the ID card 3 to identify the worker.

When the worker is found to be a legitimate one, the drive mechanism 12 is placed into an operational state. In this way, any persons other than legitimate workers cannot operate the tool 2, and therefore, an anti theft measure may be implemented.

Furthermore, the CPU 14 of the tool 2 clears the data of the actual number of screws used, which has been stored within the memory 15. By having the data cleared from the memory 15, the number of screws used can be recorded only during the working time.

Step SA4: The CPU 14 of the tool 2 determines whether or not the RFID reader/writer 4 recognized an RFID tag 5a of a magazine 5 as a result of the magazine 5 being equipped, and the presence of the RFID tag 5a of the magazine 5 within a communication range covered by the RFID reader/writer 4.

Step SA5: The CPU 14 of the tool 2, when the RFID reader/writer recognizes the RFID tag 5a of the magazine 5, starts communication using the RFID reader/writer 4 to read out a screw type data and a screw quantity data from the RFID tag 5a of the magazine 5.

Step SA6: The CPU 14 of the tool 2 detects a time using the timer 16, and communicates using the RFID reader/writer 4 to write the work starting time into the RFID tag 3a of the ID card 3.

Step SA7: The CPU 14 of the tool 2, when the screwing trigger is operated, starts counting the actual number of screws used. The actual number of screws used is stored within the memory 15.

Step SA8: The worker finishes the works by turning off the power of the tool 2 or the like.

Step SA9: The CPU 14 of the tool 2, when it determines that the work task has been finished by detecting the power-off state or the like, detects a time using the timer 16, and communicates using the RFID reader/writer 4 to write the work finishing time into the RFID tag 3a of the ID card 3. The screw type data and the actual number of screws used which have been stored within the memory 15 are also written into the RFID tag 3a of the ID card 3.

Step SA10: The CPU 14 of the tool 2 calculates a remaining screw quantity within the magazine 5 after the work task is done, from the screw quantity data as read out from the RFID tag 5a of the magazine 5 and the actual number of screws used which was stored within the memory 15 as the work task was executed. It communicates using the RFID reader/writer 4 to writes the remaining quantity data as a new quantity data into the RFID tag 5a of the magazine 5.

In the above explained operations, the work starting/finishing times, the type of tool 2 used for the works, the type of screws used and the number of times screwing was done are recorded.

In this way, by downloading the data on the ID card 3 of the worker into a computer on which the work management software is installed, those data necessary for the work management may be obtained automatically.

Furthermore, since the remaining quantity of screws is recorded for each single magazine, it is possible to exchange the magazines 5 in the middle of works in order to change the types of screws.

In a case where the tool 2 is a screwing machine etc., the ability to obtain, through the ID card 3, the data of the actual number of screws used allows the estimation of the actual hours required for completing the work task, from the frequency of the screwing operations per a unit time, so that it is also applicable to a working hour management.

Since the work starting/finishing times may be obtained through the ID card 3, it is possible to calculate an operating time of the each tool 2. In this way, it is possible to estimate the wear-out degree of the components in the tool 2, and to obtain data for repair.

Furthermore, the tool 2 has been explained as being an electric tool such as screwing machine, nailing machine etc. which uses electricity as its driving source, however, it may be any tool such as one which uses air or combustion gas as its driving source as long as it comprises a means for detecting actual number of a consumable supply used, and a power supply for its control system.

In addition, a portable tool means a tool which may be moved or carried, and the term excludes any large-scale machine tool facility installed in a plant or the like in largely a stationary manner.

The invention has been explained in detail with reference to particular embodiments, however it is apparent for a person skilled in the art that various modification and changes are possible without departing from the spirit and scope of the invention.

The present application is based on the Patent Application No. 2005-038186 filed on Feb. 15, 2005 the contents of which is incorporated herein by reference.

INDUSTRIAL APPLICABILITY

According to one or more embodiments of the invention, the invention is applicable to a system which performs resource allocation using the work management software at a construction site or the like where a large number of workers are working using electric tools etc.

The invention claimed is:

1. A portable tool comprising;
a work data acquisition device configured to obtain a work data which identifies a work task that has been performed;
a storage device configured to store the work data obtained by the work data acquisition device;
a clocking device configured to clock a working time;
a read and write device configured to read and write data into an external data storage device which is independent from the portable tool;
a control device configured to identify a worker by reading out a worker identification data using the read and write device, and write the work data stored on the storage device and a working time data clocked by the clocking device into the external data storage device using the read and write device; and
a consumable supply container which contains a consumable supply used during the work task, and which can freely be attached to and removed from the body of the portable tool;
wherein the external data storage device comprises a consumable supply data storage device provided on the consumer supply container, the consumable supply data storage device storing a consumable supply identification data identifying a type of the consumable supply and a consumable supply quantity data;
the control device identifies the type of the consumable supply by reading out the consumable supply identification data and the consumable supply quantity data using the read and write device,
the control device recognizes the quantity of the consumable supply before the work task is carried out, the control device calculates a remaining quantity of the consumable supply left within the consumable supply container from a number of the consumable supply used while the work task is carried out, and
the control device writes the remaining quantity data of the consumable supply into the consumable supply data storage device of the consumable supply container using the read and write device.

2. A portable tool comprising:
a work data acquisition device configured to obtain a work data which identifies a work task that has been performed;
a storage device configured to store the work data obtained by the work data acquisition device;
a clocking device configured to clock a working time;
a read and write device configured to read and write data into an external data storage device which is independent from the portable tool; and
a control device configured to identify a worker by reading out a worker identification data using the read and write device, and write the work data stored on the storage device and a working time data clocked by the clocking device into the external data storage device using the read and write device,
wherein the portable tool is a screwing machine.

3. The portable tool according to claim 2, wherein the external data storage device comprises an ID card of the worker, and
the control device writes the work data and the working time data into the ID card of the worker identified by the worker identification data using the read and write device.

4. The portable tool according to claim 2, wherein the external data storage device comprises a wireless tag which transmits and receives data wirelessly, and
the read and write device reads and writes data through wireless communications.

5. A portable tool comprising:
a work data acquisition device configured to obtain a work data which identifies a work task that has been performed;
a storage device configured to store the work data obtained by the work data acquisition device;
a clocking device configured to clock a working time;
a read and write device configured to read and write data into an external data storage device which is independent from the portable tool; and
a control device configured to identify a worker by reading out a worker identification data using the read and write device, and write the work data stored on the storage device and a working time data clocked by the clocking device into the external data storage device using the read and write device,
wherein the portable tool is a nailing machine.

6. The portable tool according to claim 5, wherein the external data storage device comprises an ID card of the worker, and
the control device writes the work data and the working time data into the ID card of the worker identified by the worker identification data using the read and write device.

7. The portable tool according to claim 5, wherein the external data storage device comprises a wireless tag which transmits and receives data wirelessly, and
the read and write device reads and writes data through wireless communications.

8. A work management data collection system for collecting data necessary for work management of work tasks, wherein a portable tool used for the work tasks comprises:
a work data acquisition device configured to obtain a work data which identifies a work task that has been performed;
a storage device configured to store the work data obtained by the work data acquisition device;
a clocking device configured to clock a working time;
a read and write device configured to read and write the data into an external data storage device which is independent from the portable tool; and
a control device configured to identify a worker by reading out a worker identification data using the read and write device, and write the work data stored on the storage device and the working time data clocked by the clocking device into the external data storage device using the read and write device,
wherein the portable tool is one of a screwing machine and a nailing machine.

* * * * *